United States Patent [19]

Spurlock

[11] 3,913,062

[45] Oct. 14, 1975

[54] QUICK CONNECT/DISCONNECT DUMILOAD SONAR TRANSDUCER TEST METHOD

[75] Inventor: Eugene M. Spurlock, Menlo Park, Calif.

[73] Assignee: The United States of America as represented by the Secretary of the Navy, Washington, D.C.

[22] Filed: Apr. 10, 1974

[21] Appl. No.: 459,511

[52] U.S. Cl. ................................. 340/5 C; 73/1 DV
[51] Int. Cl.² .......................................... H04R 29/00
[58] Field of Search ..................... 340/5 C; 73/1 DV

[56] References Cited
UNITED STATES PATENTS

| | | | |
|---|---|---|---|
| 3,167,150 | 1/1965 | Darby et al. ..................... | 340/5 C X |
| 3,303,688 | 2/1967 | Hickman et al. ................. | 340/5 C X |

Primary Examiner—Richard A. Farley
Attorney, Agent, or Firm—R. S. Sciascia; P. Schneider; W. T. Ellis

[57] ABSTRACT

A method of coupling a test transducer to a DUMILOAD (disclosed in U.S. Pat. No. 3,303,688) such that there may be quick connection and disconnection from the test apparatus. This method comprises the steps of:

a. placing a reservoir bath filled with water that is treated with a surace-tension modifier around the face of the DUMILOAD transducer;

b. placing the face of the transducer to be tested into the treated water bath until there is only a thin fluid film between the faces of the two transducers; and c. applying a force to the tail of the case of the case of the test transducer at a 90° angle to its face to force a closer contact between the faces and increase the effective bonding.

3 Claims, 3 Drawing Figures

U.S. Patent  Oct. 14, 1975  3,913,062
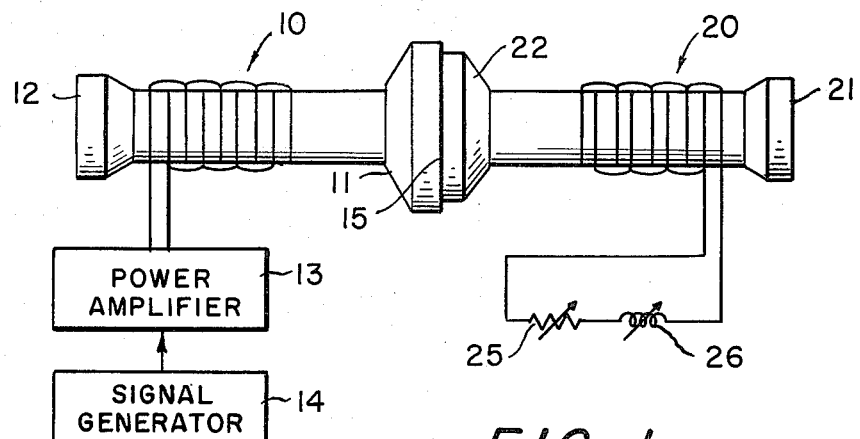
FIG. 1.
PRIOR ART
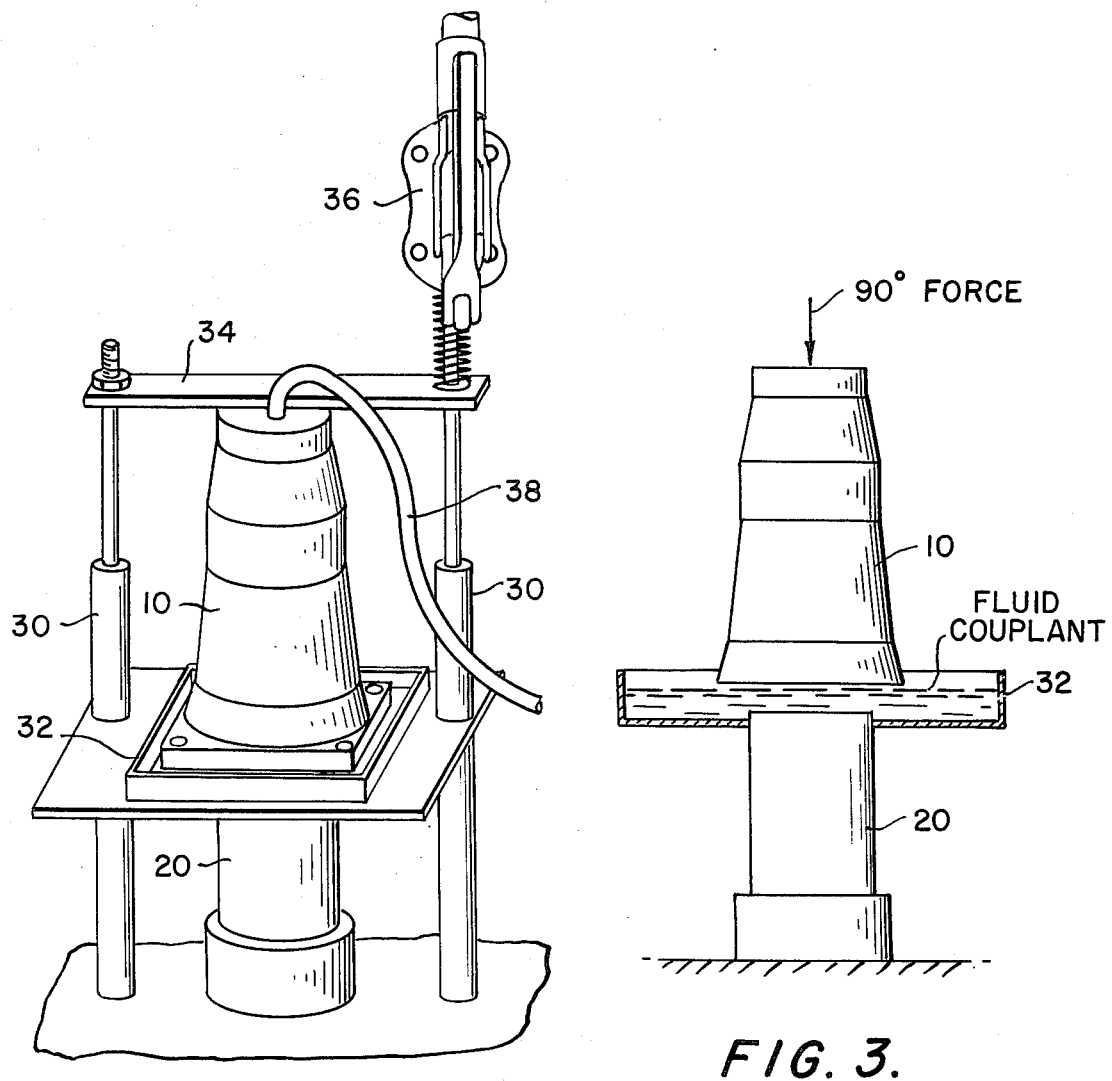
FIG. 2.
FIG. 3.

QUICK CONNECT/DISCONNECT DUMILOAD SONAR TRANSDUCER TEST METHOD

FIELD OF INVENTION

This invention relates generally to the testing of transducers and in particular to a method of testing an underwater transducer using a DUMILOAD test transducer.

PRIOR ART

Transmitting transducer elements for ensonifying the sea with reasonable amounts of acoustic energy are quite large, very heavy, and extremely expensive. After manufacture, the individual elements or arrays of elements must be lowered by derrick into the water for testing electric power fed through waterproof cables into the transducer can be measured, but accurate determination of the acoustic output is difficult and expensive. Determinations of such characteristics as directional patterns and phase relations of input and output leaves much to be desired, largely because of the unfriendly environment in which the testing must be done. The difficulties of testing are compouned when large arrays of transducers must be assembled and lowered into the water.

Obviously, laboratory bench testing for such a transducer is very desirable. The principal problem in the laboratory testing of an underwater transducer is to simulate the actual under-water environment of the transducer. This problem has been solved by the development by Hickman and Martin of the dummy mechanical impedance load disclosed by U.S. Pat. No. 3,303,688.

FIG. 1 represents the Hickman et al test set-up. While the transducer to be tested may be of any type, the particular transducer 10 shown in FIG. 1, is of the electro-ceramic type having a coaxial series of rings of electrostrictive material, such as barium titanate. Alternate electrodes of the rings are connected together and hence to one side of the power amplifier 13, while the remaining electrodes are connected together and to the other side of the amplifier. The amplifier is driven by the signal generator 14 having adjustable frequency. One end of the ceramic stack is connected to the tail piece mass 12 which the other end of the stack is connected to the head piece 11, the face 15 of which oscillates in response to the signal applied. Alternatively, the transducer may be of the electromagnetic type in which the ceramics are replaced by the variable reluctance vibrating motor of conventional design.

The dummy transducer is shown at 20 and comprises a tail piece 21 and the head piece 22. The rings of electrostrictive material in the dummy transducer are connected to a variable resistance 25 and a variable reactance 26.

The actual transducer testing is performed by first stiffly coupling the radiating face of the test transducer to the dummy transducer. The variable resistance and capacitance elements are selected so as to present to the face of the test transducer the complex radiation impedance that would be encountered at any location in a submerged array. A signal source 14 then is set to apply the frequency of interest to the electrical terminals of the test transducer. The radiating face of the test transducer 10 then applies its mechanical radiationis to the face of the radiations coupled dummy transducer 20. The dummy transducer 20 converts this transferred mechanical energy at its face to electrical energy and the resistance of the terminating load dissipates this energy.

Thus the effective mass and stiffness of the dummy transducer face, as controlled by the values the resistance and reactance at its terminals, simulate the mass and stiffness characteristics as they would occur at the transducer face in the underwater array.

The Hickman technique of securely bonding the transducer faces by stiffly coupling the transducer under test to the DUMILOAD element requires the use of an almost permanent bonding connection. This is commonly accomplished by bolting the transducers tightly together. Each bolt must be carefully adjusted so that there is a uniform pressure exerted over the entire interface. Obviously, this technique precludes any type of rapid testing and is very expensive labor wise.

SUMMARY OF THE INVENTION

To solve this problem the test method of the present invention was developed. This method comprises the basic steps of:
a. Replacing the solid bond between the test transducer and the DUMILOAD with a thinfilm fluid coupler.
b. Applying a mechanical pressure to the tailend of the test transducer at a 90° angle.

OBJECTS OF THE INVENTION

An object of the present invention is to permit rapid testing of transducer elements in a production or restoration environment.

A further object of the present invention is to couple a test transducer to a DUMILOAD without permanent bonding.

Other objects, advantages and novel features of the present invention will become apparent from the following detailed description of the invention when considered in conjunction with the accompanying drawing.

BRIEF DESCRIPTION OF THE DRAWING

FIG. 1 is the prior-art Hickman DUMILOAD test system.

FIG. 2 is the DUMILOAD test set-up of the present inventive method.

FIG. 3 is a view of the DUMILOAD test set-up when the transducers are not bonded together.

DETAILED DESCRIPTION OF THE INVENTION

The initial problem in formulating a quick connect/disconnect coupling method is to find a fluid coupler that will replace the solid bond between the test transducer and the DUMILOAD transducer of the Hickman patent and yet retain the impedance transfer characteristics necessary to the simulation of a water load on the test element.

A number of coupling fluids, such as castor oil, Lubricin, glycerol, and water-soluble gels were evaluated in an effort to locate a coupler that would have the following characteristics:
1. Stable and reproducible acoustical performance, attainable in a short time;
2. Rapid application;
3. Noninjurious to transducer surfaces;
4. Water-soluble for rapid removal of the fluid.

It was determined that water treater with a surface-tension modifier such as the Eastman Kodak detergent PHOTO-FLO has all of the above characteristics. It is to be understood that any tension modifier could be used here to treat the water. This treated water is applied as a coupling film at the test transducer — DUMILOAD transducer interface by the addition of a reservoir bath surrounding this interface. The additional fluid held in the reservoir acts to modify the rate at which the fluid coupler is driven from the active area by the pumping action of the vibrating face of the transducer under test. It was determined that the level of the coupler must at least be above the interface of the transducers.

FIG. 2 illustrates the testing set-up of the present inventive method. The DUMILOAD transducer 20 is at the lower section of the test stand 30 with its transducer face facing upward. Above the transducer face is the fluid reservoir 32 which is approximately one-fourth to three-eighths inch deep and completely covers the interface of the transducers. Any form of reservoir could be used. The only requirement is that the transducers be acoustically insulated from the reservoir structure. In the present embodiment, the upper section of the dummy transducer is ringed with a silicon rubber acoustic insulator. A metal plate is then fitted so as to extend horizontally out from said rubber insulation. A metal strip is then welded to this horizontal flat circular plate to form a pan-like structure. A better view of this pan-like structure is shown in FIG. 3. The transducer under test 10 is slowly lowered face down into this fluid-reservoir-bath until there is only a thin fluid film between the faces of the two transducers.

It has been determined that in order to achieve high-power operation of the test transducer during DUMILOAD testing with a fluid coupler, a mechanical pressure must be applied to the test element. This pressure forces the active face into closer contact with the DUMILOAD transducer face, thus increasing the effective bonding.

Cavitation problems arise whenever a fluid couplant is used with a vibrating structure. Cavitation occurs in this instance when the pressure of the fluid coupler is less than or equal to its vapor pressure. Thus when the transducer face moves inward, the treated water couplant pressure is reduced. If this reduced water pressure equals or drops below its vapor pressure, cavitation results. Cavitation consists of the production of vapor bubbles or cavities in front of the transducer face. These vapor cavities cause pressure discontinuities at the transducer face thereby causing a substantial change in the impedance for the test transducer. In order to prevent such discontinuities, the power level that is fed to the transducer must be severely limited.

The application of a mechanical force at the tail-end of the case of the transducer under test removes this power limitation by producing a substantial increase in the pressure at the face. Thus the hydrostatic pressure is increased and it is more difficult for the negative face pressure to exceed the hydrostatic pressure and cause cavitation. The minimum pressure necessary is approximately 10 to 15 p.s.i.g. at the transducer face-plate, a pressure normally experienced by such a transducer during actual underwater operation.

In the testing set-up of FIG. 1, the two vertical posts 30 support the transducer 10 and dummy transducer 20. A calibrated spring 36 applies a pressure evenly through a metal plate 34. It is critical that the plate 34 be parallel to the face-plate of the transducer 10 in order that the force applied by the calibrated spring 36 by normal to the face-plate. If the force angle deviates from this normal, the couplant film thickness becomes uneven across the face-plate, thus giving an uneven transmission.

The electrical lead to the transducer under test is shown in the figure as line 38. The voltage and current waveforms are monitored on an oscilloscope off this line 38 as a check for proper waveforms and voltage breakdown.

Thus with the combined use of a modified water couplant and the careful application of mechanical pressure, quick connection/disconnection of a transducer to a DUMILOAD is possible. The method of the present invention provides a reliable and repeatable high-level, in-process test procedure for transducer elements.

Obviously, many modifications and variations of the present invention are possible in light of the above teachings. It is therefore to be understood that, within the scope of the appended claims, the invention may be practiced otherwise than as specifically described.

What is claimed is:

1. A method for coupling a high-power transducer to be tested to a dummy impedance-load transducer such that there may be a quick connection and disconnection from the test apparatus comprising the steps of:
   placing a reservoir bath filled with a fluid couplant around the upper section of the dummy impedance-load transducer adjacent to its transducer face so that the interface where the face of the dummy impedance-load transducer and the face of the high power transducer under test are to meet is completely immersed in said fluid couplant;
   lowering the transducer under test facedown into the bath until there is only a thin fluid film between the faces of the two transducers; and
   applying a mechanical force of at least 10 to 15 p.s.i.g. to the tail-end of the case of the transducer under test to force a close contact between the faces of the transducers, thus increasing their effective bonding and preventing cavitation.

2. A method for coupling transducers as in claim 1 wherein the thin fluid film is water treated with a surface-tension modifier.

3. A method for coupling transducers as in claim 2 wherein the mechanical force is applied at an angle of 90° to the transducer face.

* * * * *